United States Patent [19]

Oates

[11] Patent Number: 5,169,165
[45] Date of Patent: Dec. 8, 1992

[54] SCOOTER VEHICLE HAVING AUXILIARY BALANCING WHEELS

[76] Inventor: Horace R. Oates, 3608 Hillsdale Rd., Baltimore, Md. 21207

[21] Appl. No.: 760,375
[22] Filed: Sep. 16, 1991
[51] Int. Cl.⁵ .................. B62B 9/18; B62M 29/00
[52] U.S. Cl. .................. 280/87.03; 280/87.041; 280/282; 280/304; 280/767
[58] Field of Search .......... 280/87.021, 87.03, 87.041, 280/87.042, 14.3, 28.15, 43.19, 47.2, 47.41, 767, 218, 282, 293, 304; D12/109, 113; D21/226, 227

[56] References Cited

U.S. PATENT DOCUMENTS

| | | | |
|---|---|---|---|
| 476,297 | 6/1892 | Overs | 280/293 |
| 561,262 | 6/1896 | Lincoln | 280/304 |
| 1,253,768 | 1/1918 | Aman | 280/87.041 |
| 1,269,107 | 6/1918 | Moomaw | 280/87.041 |
| 2,185,698 | 1/1940 | Wright | 280/87.041 X |
| 2,597,748 | 5/1952 | Powell | 280/87.041 |
| 3,471,168 | 10/1969 | Steinberg et al. | 280/767 |
| 4,076,270 | 2/1978 | Winchell | 280/218 X |
| 4,342,466 | 8/1982 | Morgan | 280/87.03 |
| 4,462,634 | 7/1984 | Hanagan | 297/311 X |
| 4,772,069 | 9/1988 | Szymski | 297/311 X |

FOREIGN PATENT DOCUMENTS

| | | | |
|---|---|---|---|
| 0006561 | of 1896 | United Kingdom | 280/293 |
| 0017233 | of 1910 | United Kingdom | 280/87.041 |

Primary Examiner—Charles A. Marmor
Assistant Examiner—Brian L. Johnson
Attorney, Agent, or Firm—Leon Gilden

[57] ABSTRACT

A scooter apparatus includes a base plate, with the base plate mounting a steering tube rotatably at a forward end of the base plate for rotation and steering of a front wheel by use of handle bars mounted to an upper terminal end of the steering tube. A seat post adjustably mounts a seat in a rotative relationship relative to the seat post for adjustment of the seat for use by an individual. Rearwardly extending braces directed to the rear wheel axle and to the seat post sleeve fixedly secures the seat post in a rigid orientation relative to the base plate. A modification of the invention includes bifurcated right and left wheel supports mounting a right and left balance wheel in a spring-biased relationship relative to distal terminal ends of right and left mounting arms to permit rocking of the apparatus in use.

2 Claims, 4 Drawing Sheets

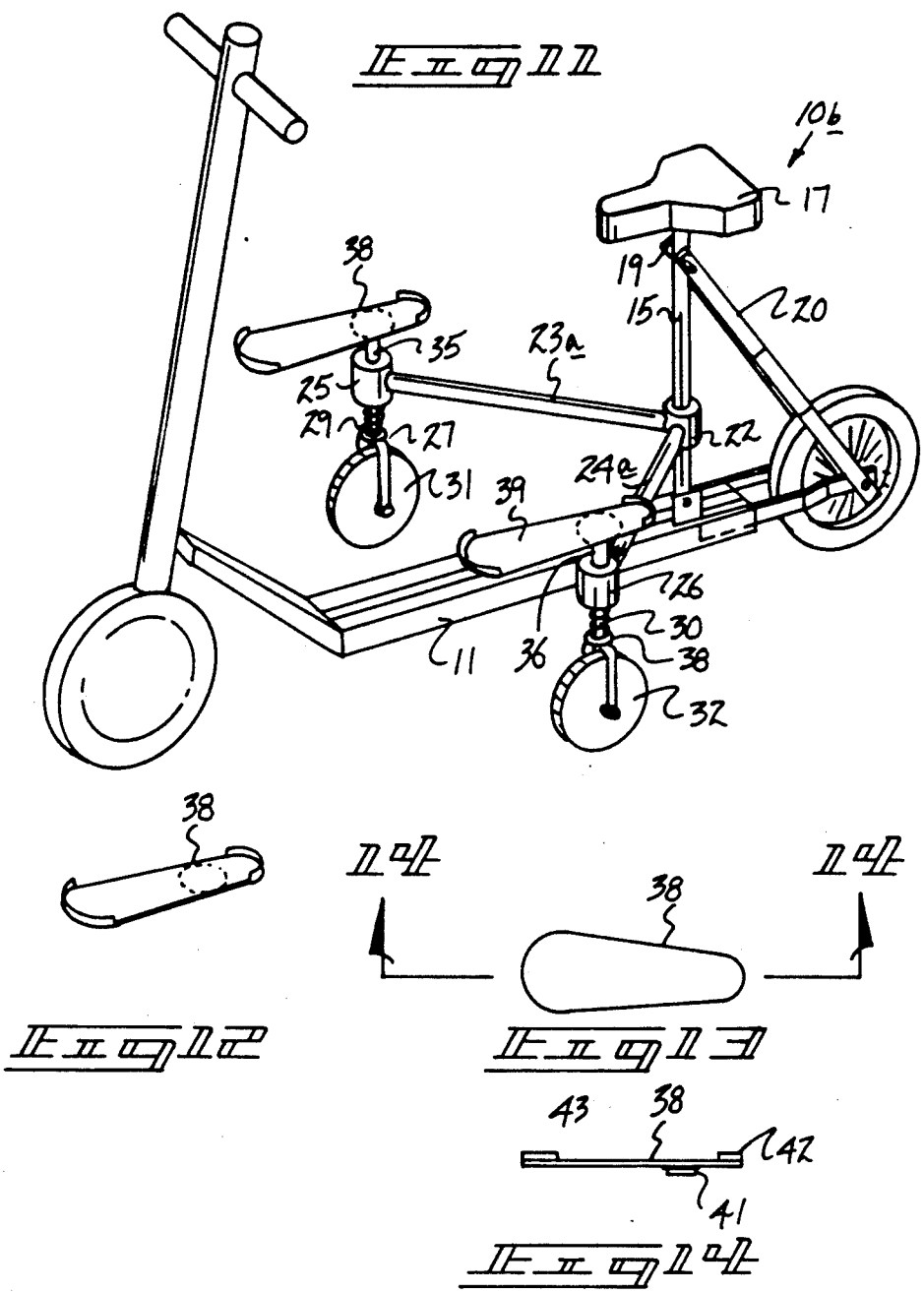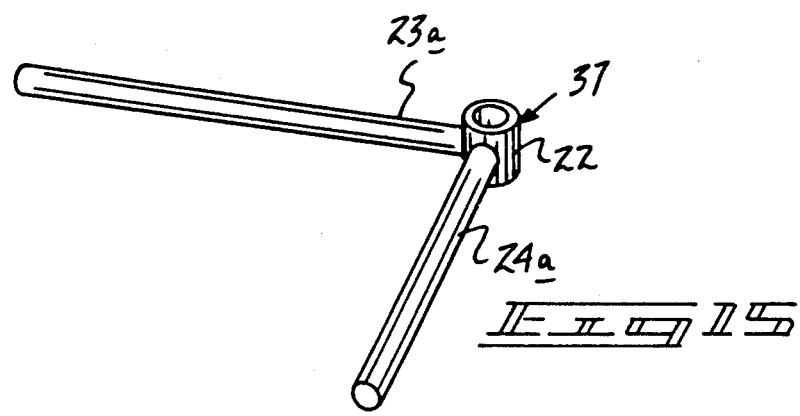

SCOOTER VEHICLE HAVING AUXILIARY BALANCING WHEELS

BACKGROUND OF THE INVENTION

1. Field of the Invention

The field of invention relates to scooter apparatus, and more particularly pertains to a new and improve scooter apparatus wherein the same permits propulsion of an individual about an underlying surface.

2. Description of the Prior Art

Various categories of foot propelled scooter apparatus has been utilized in the prior art to permit mounting of an individual upon a support base while simultaneously permitting propulsion of the individual utilizing a foot in contact with an underlying support surface. Such scooter apparatus is exemplified in U.S. Pat. No. 4,342,466 to Morgan wherein a scooter is arranged with an integral seat mounted adjacent a forward end of a scooter and the associated base plate.

U.S. Pat. No. 4,772,069 to Szymski sets forth an adjustable seat mounted relative to a support post.

U.S. Pat. No. 4,462,634 to Hanagan sets forth an adjustable motorcycle seat arranged for various angles of inclination.

As such, it may be appreciated that there continues to be a need for a new and improved scooter apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of scooter apparatus now present in the prior art, the present invention provides a scooter apparatus wherein the same is arranged for seat adjustment relative to a scooter base plate during use. As such, the general purpose of the present invention, which will be described subsequently in greater detail, is to provide a new and improved scooter apparatus which has all the advantages of the prior art scooter apparatus and none of the disadvantages.

To attain this, the present invention provides a scooter apparatus including a base plate, with the base plate mounting a steering tube rotatably at a forward end of the base plate for rotation and steering of a front wheel by use of handle bars mounted to an upper terminal end of the steering tube. A seat post adjustably mounts a seat in a rotative relationship relative to the seat post for adjustment of the seat for use by an individual. Rearwardly extending braces directed to the rear wheel axle and to the seat post sleeve fixedly secures the seat post in a rigid orientation relative to the base plate. A modification of the invention includes bifurcated right and left wheel supports mounting a right and left balance wheel in a spring-biased relationship relative to distal terminal ends of right and left mounting arms to permit rocking of the apparatus in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved scooter apparatus which has all the advantages of the prior art scooter apparatus and none of the disadvantages.

It is another object of the present invention to provide a new and improved scooter apparatus which may be easily and efficiently manufactured and marketed.

It is a further object of the present invention to provide a new and improved scooter apparatus which is of a durable and reliable construction.

An even further object of the present invention is to provide a new and improved scooter apparatus which is susceptible of a low cost of manufacture with regard to both materials and labor, and which accordingly is then susceptible of low prices of sale to the consuming public, thereby making such scooter apparatus economically available to the buying public.

Still yet another object of the present invention is to provide a new and improved scooter apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 11 is an isometric illustration of a further modification of the invention.

FIG. 12 is an isometric illustration of a foot support as utilized in the invention as set forth in FIG. 11.

FIG. 13 is an orthographic top view of the foot support.

FIG. 14 is an orthographic view, taken along the lines 14—14 of FIG. 13 in the direction indicated by the arrows.

FIG. 15 is an isometric illustration of the central support collar and the associated mounting arms utilized by the invention, as set forth in FIG. 11.

DESCRIPTION OF THE PREFERRED EMBODIMENT

Figure 1:
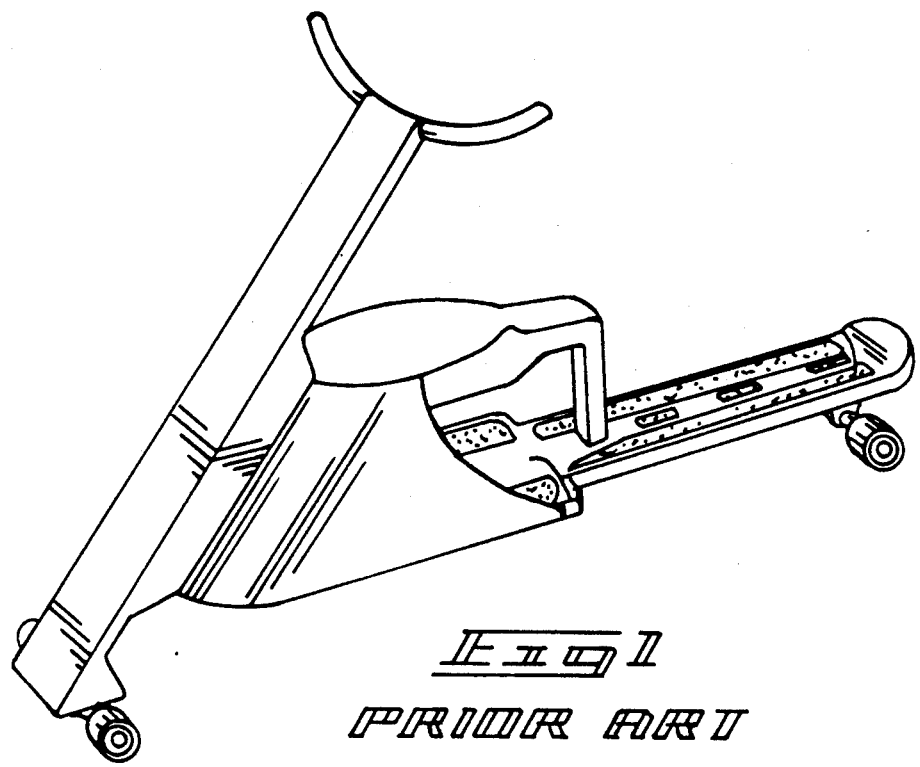
FIG. 1 is an isometric illustration of a prior art scooter apparatus.
Figure 2:
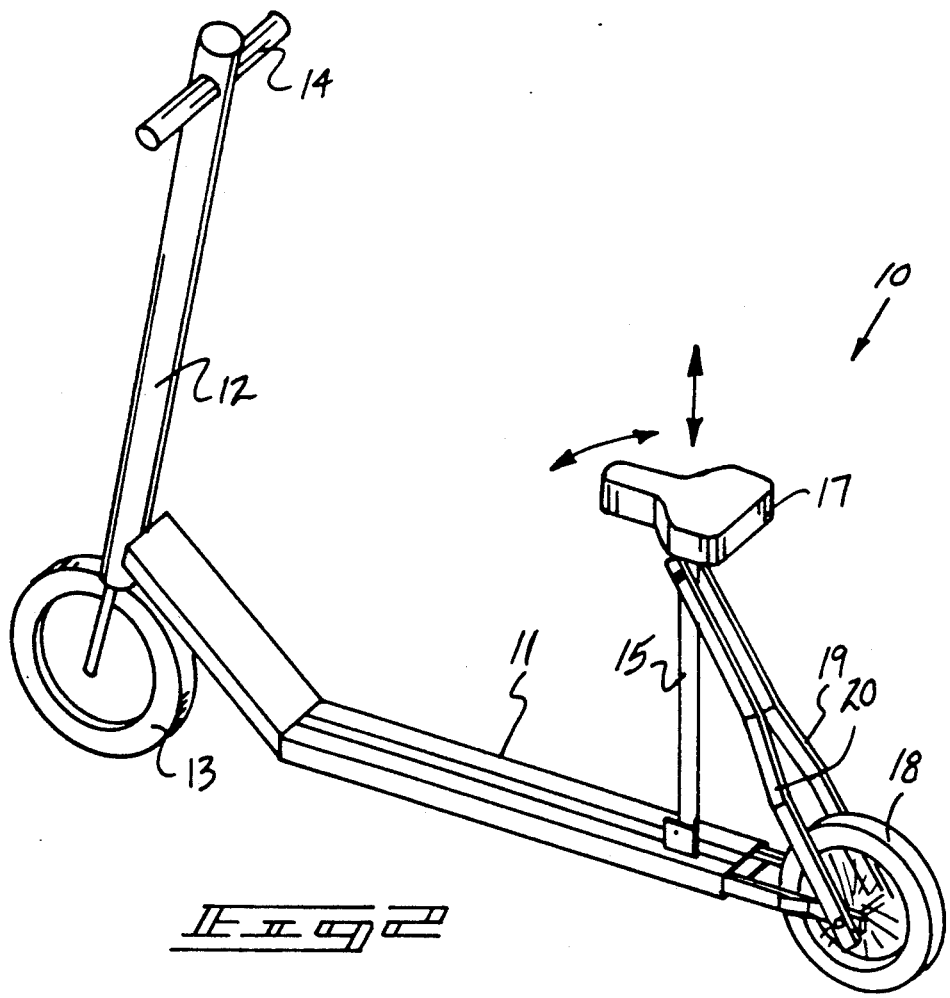
FIG. 2 is an isometric illustration of the instant invention.
Figure 3:
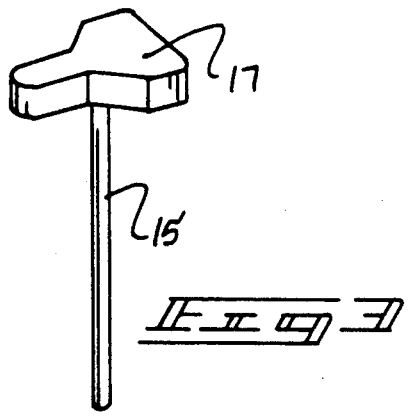
FIG. 3 is an isometric illustration of the seat and support post of the invention.
Figure 7:
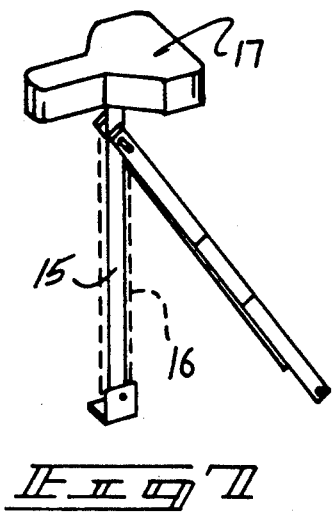
FIG. 7 is an isometric illustration of the seat in association relative to the seat support braces.
Figure 4:
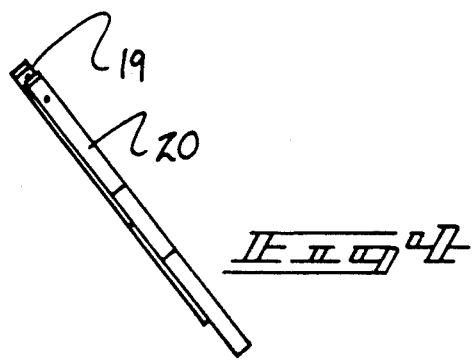
FIG. 4 is an isometric illustration of the seat support brace, as utilized by the invention.
Figures 5, 6:
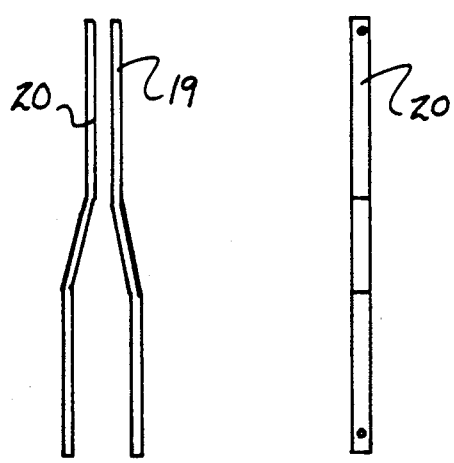
FIG. 5 is an orthographic frontal view of the seat support braces.
FIG. 6 is an orthographic side view of the seat support braces.
Figure 8:
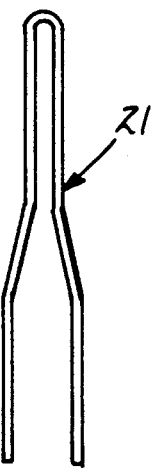
FIG. 8 is an orthographic view of the seat support braces configured in a "U" shaped manner.

With reference now to the drawings, and in particular to FIGS. 1 to 15 thereof, a new and improved scooter apparatus embodying the principles and concepts of the present invention and generally designated by the reference numerals 10, 10a, and 10b will be described.

FIG. 1 illustrates a prior art scooter and integral seat structure, as illustrated and exemplified in U.S. Pat. No. 4,342,466.

More specifically, the scooter apparatus 10 of the instant invention essentially comprises a base plate 11 mounting a steering tube 12 rotatably at a forward end of the base plate that includes a front wheel 13 mounted at a lower terminal end of the steering tube, with a handle bar 14 mounted at an upper end of the steering tube. A seat post 15 is mounted adjacent a rear terminal end of the base plate extending orthogonally upwardly therefrom, with the seat post 15 optionally mounted within a seat post sleeve 16 (see FIG. 7) to permit adjustable elevation of the seat member and post relative to the sleeve 16. Further, the seat member 17 may be pivotally mounted to the seat post 15 in a manner as set forth in U.S. Pat. No. 4,772,069 incorporated herein by reference setting forth conventional adjustment of a seat member relative to a post in rotative and telescoping relationship. The rear wheel 18 of the apparatus is rotatably mounted rearwardly of the steering tube about a central axle, with the central axle including a respective right and left brace 19 and 20 extending upwardly from the central axle to the seat post 15, or alternatively to the seat post sleeve 16 should a sleeve 16 be utilized. Alternatively a "U" shaped brace 21 may be provided in lieu of an independent right and left brace 19 and 20. In this manner, geometric integrity is provided and afforded to the seat post sleeve 16 or the seat post 15 in use with the base plate 11.

Figure 9:
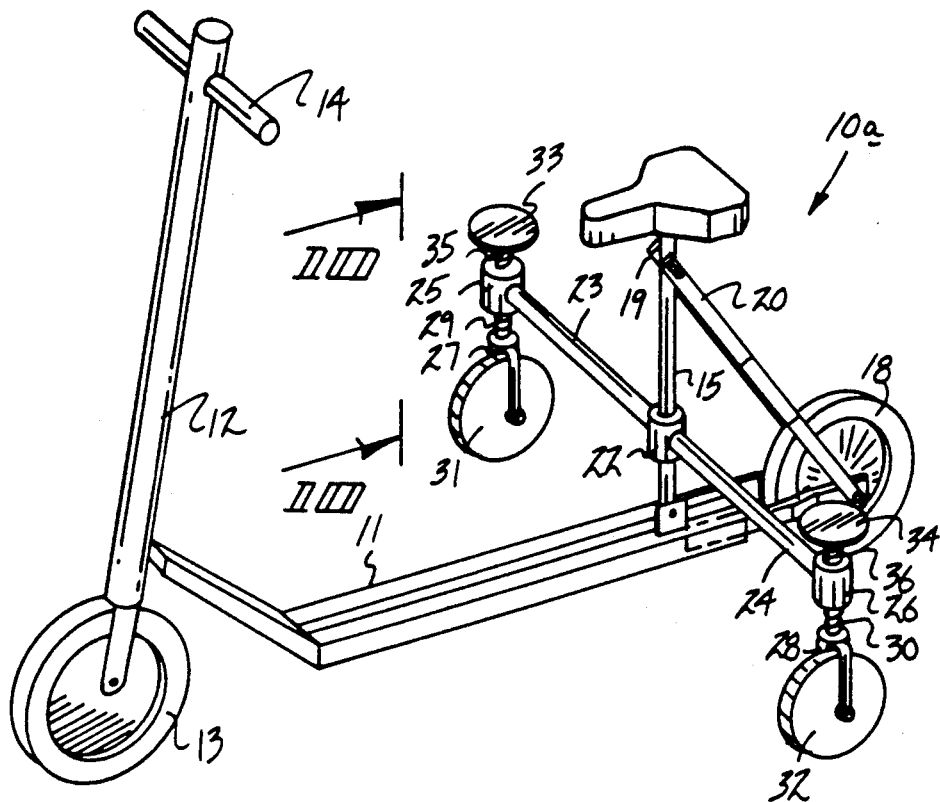
FIG. 9 is an isometric illustration of a modification of the invention.
Figure 10:
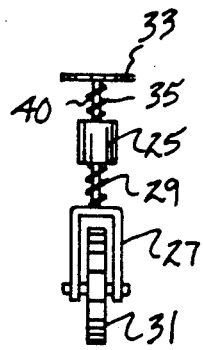
FIG. 10 is an orthographic view, taken along the lines 10—10 of FIG. 9 in the direction indicated by the arrows.

The FIG. 9 illustrates a modified apparatus 10a that includes a plurality of balance wheels. More specifically, a central support collar 22 is provided that includes a respective right and left mounting arm 23 and 24 respectively directed laterally to diametrically opposed sides of the central collar 22 extending in longitudinal alignment relative to one another. A modified right and left mounting arm 23a and 24a, as illustrated for use in the FIG. 11, wherein the modified mounting arms extend laterally to opposed sides of the support collar 22 defining an acute angle therebetween as the modified mounting arms 23a and 24a extend forwardly of the seat post 15. A respective right and left bifurcated wheel support 27 and 28, each mounted at respective right and left balance wheel 31 and 32 rotatably between the bifurcated wheel supports. Each bifurcated wheel support includes a support post 40 extending upwardly therefrom, wherein the support post of the respective right and left support collars 25 and 26 each include a respective right and left abutment plate 33 and 34 orthogonally mounted at an upper terminal end thereof. A right lower and a left lower spring 29 and 30 are captured between a respective right and left support collar 25 and 26 mounted at a free distal end of each mounting arm. A respective right and left top spring 35 and 36 are captured between the respective right and left support collars 25 and 26 and the respective right and left abutment plates 33 and 34. In this manner, an individual may be encouraged to rock the scooter apparatus 10a in use for enhanced amusement and enjoyment employing the top and lower springs of each balance wheel assembly in that use.

The further modified apparatus 10b, as illustrated in the FIG. 11 for example, deploys the modified right and left mounting arms 23a and 24a forwardly, wherein in lieu of the respective right and left abutment plates 33 and 34, a right and left foot support cradle 38 and 39 are utilized to enhance mounting of an individual's feet thereon, wherein the individual may manipulate the top and lowered captured springs for the rocking motion, as well as enhance balancing of the organization in use. Each support cradle includes a socket 41 mounted at a lower terminal end thereof to receive the associated support post 40 therewithin. A rear and forward flange 42 and 43 are mounted to respective rear and forward ends of the support cradle to position an individual's foot within the cradle in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scooter apparatus, comprising, a base plate, the base plate including a steering tube mounted rotatably to a forward end of the base plate, with the steering tube mounting a front wheel at a lower terminal end thereof, and the steering tube including a handle bar at an upper terminal end thereof, and the base plate including a rear wheel rotatably mounted rearwardly of the base plate about a rear wheel central axle, and a seat post sleeve fixedly and orthogonally mounted to the base plate extending upwardly therefrom, including a respective right and left brace member each mounted to the seat post sleeve and each extending from the seat post sleeve to the rear wheel central axle, and a seat post telescopingly mounted within the sleeve, and the seat post mounting a seat member at an upper terminal end thereof, and a central support collar mounted to the seat post sleeve between the base plate and the seat member, wherein the central support collar includes a respective right and left mounting arm extending laterally of the central support collar to opposed sides of the base plate, and the right and left mounting arms define an acute angle therebetween, and the right mounting arm includes a right support collar, and the left mounting arm includes a left support collar, wherein the right and left support collars are arranged in a parallel relationship relative to one another, and each slidingly mount a respective right and left support post therethrough, and each right and left support post includes a respective right and left bifurcated wheel support fixedly mounted at a lower terminal end of the respective right and left support posts, wherein the right and left bifurcated wheel support rotatably mounts a respective right and left balance wheel, and a respective right and left lower spring captured between the respective right and left support collar and the respective right and left bifurcated wheel support, and a respective right and left foot support cradle mounted at an upper terminal end of the respective right and left support posts, and a respective right and left top spring captured between the respective right and left foot support cradle and the respective right and left support collar.

2. An apparatus as set forth in claim 1 wherein each foot support cradle of said right and left foot cradles includes a respective rear and forward flange extending upwardly of the right and left foot support cradle for positioning an individual's foot within the respective right and left foot support cradle.

* * * * *